United States Patent [19]

Bäbler

[11] Patent Number: 5,199,651
[45] Date of Patent: Apr. 6, 1993

[54] GRINDING ORGANIC PIGMENTS

[75] Inventor: Fridolin Bäbler, Marly, Switzerland

[73] Assignee: Ciba-Geigy Corporation, Ardsley, N.Y.

[21] Appl. No.: 414,632

[22] Filed: Sep. 27, 1989

Related U.S. Application Data

[63] Continuation of Ser. No. 352,710, May 11, 1989, abandoned, which is a continuation of Ser. No. 212,118, Jun. 27, 1988, abandoned, which is a continuation of Ser. No. 520,932, Aug. 8, 1983, abandoned.

[30] Foreign Application Priority Data

Aug. 20, 1982 [CH] Switzerland ............... 4979/82

[51] Int. Cl.⁵ .............................. B02C 23/18
[52] U.S. Cl. .................................... 241/16
[58] Field of Search ............ 241/15, 16, 21, 22; 106/308 Q

[56] References Cited

U.S. PATENT DOCUMENTS 2,982,666 5/1961 Chun et al. .
3,046,282 7/1962 Buckwalter .
4,024,148 5/1977 Tyson et al. .
4,262,851 4/1981 Graser et al. .................. 241/16

FOREIGN PATENT DOCUMENTS 2714778 10/1978 Fed. Rep. of Germany .
2824416 12/1979 Fed. Rep. of Germany ... 106/308 Q
 381781 11/1964 Switzerland .
1113060  5/1968 United Kingdom .
1395700  5/1975 United Kingdom ........... 106/308 Q Primary Examiner—Joseph M. Gorski
Attorney, Agent, or Firm—JoAnn Villamizar

[57] ABSTRACT

A process for conditioning organic pigments by grinding them in water in the presence of a grinding assistant, which comprises using as the grinding assistant an unsubstituted or phenyl-substituted aliphatic or cycloaliphatic 1,2-dihydroxy compound having 6 to 30 C atoms.

The process gives pigments which have good dispersing properties in high molecular weight organic material.

8 Claims, No Drawings

GRINDING ORGANIC PIGMENTS

This application is a continuation of application Ser. No. 352,710, filed May 11, 1989, now abandoned, which is a continuation Ser. No. 212,118, filed Jun. 27, 1988, now abandoned, which is a continuation Ser. No. 520,932, filed Aug. 8, 1983, now abandoned.

Organic pigments obtained in their preparation in the form of coarse crystals generally have to be subjected to an aftertreatment or so-called conditioning to attain a usable and coloristically useful pigment form. The aftertreatment or conditioning is intended to produce the best particle size, especially in respect of tinctorial strength. A well-known method of aftertreating or conditioning organic pigments is to grind them in water. However, in the course of grinding in wet-grinding devices pigment crystals are subject to high compressive and impact forces, and are thereby not only comminuted but also, depending on the type of pigment, more or less strongly reagglomerated. This reagglomeration then leads to pigments having poor dispersing properties and hence to weak colourings.

Various aids are known for adding to the grinding process to prevent the pigment particles from reagglomerating. These grinding aids have various disadvantages. For example, they have to be used in uneconomically large amounts, they require a long grinding time, they are only suitable for certain pigments or they can only be removed, and regenerated, with much effort. If, on the other hand, certain 1,2-dihydroxy compounds are chosen for use as grinding aids, the pigments obtained are very readily dispersible and are free from said disadvantages.

The invention thus provides a process for conditioning organic pigments by grinding them in water in the presence of a grinding aid, which comprises using as the grinding aid an unsubstituted or phenyl-substituted aliphatic or cycloaliphatic 1,2-dihydroxy compound having 6 to 30 C atoms.

Examples of suitable 1,2-dihydroxy compounds are hexane-1,2-diol, heptane-1,2-diol, octane-1,2-diol, nonane-1,2-diol, decane-1,2-diol, undecane-1,2-diol, dodecane-1,2-diol, tridecane-1,2-diol, tetradecane-1,2-diol, pentadecane-1,2-diol, hexadecane-1,2-diol, heptadecane-1,2-diol, octadecane-1,2-diol, nonadecane-1,2-diol, eicosane-1,2-diol, heneicosane-1,2-diol, docosane-1,2-diol, pentacosane-1,2-diol, triacontane-1,2-diol, 1-phenylethane-1,2-diol, 2-phenylpropane-1,2-diol, cyclohexane-1,2-diol and cycloheptane-1,2diol, singly or mixed.

The process of the invention is preferably carried out with unsubstituted aliphatic 1,2-dihydroxy compounds, in particular with those which have 6 to 18 C atoms. It is particularly preferable to use hexane-1,2-diol, octane-1,2-diol, dodecane-1,2-diol and hexadecane-1,2-diol. The 1,2-dihydroxy compounds can be used in amounts of, in particular, 0.05 to 25, preferably 0.5 to 20, % by weight, based on the pigment or pigment mixture to be ground.

Examples of organic pigments which can be conditioned by means of the process of the invention are pigments of the perylene, phthalocyanine, perinone, quinacridone, quinophthalone, isoindolinone, isoindoline, dioxazine, anthraquinone, thioindigo, azo, methine or azomethine series. In the case of pigments of the phthalocyanine, methine or azomethine series it is possible to use not only those which are metal-free but also those which are metal complexes. It is also possible to use pigment mixtures.

The process of the invention is particularly suitable for conditioning pigments of the perylene, azo, isoindoline or isoindolinone series, especially for conditioning pigments which markedly tend to agglomerate under the influence of mechanical forces, such as pressures, for example C. I. Pigment Brown 23, C. I. Pigment Red 220, C. I. Pigment Yellow 147 or C. I. Pigment Red 166.

The apparatus used for the grinding can be any device for subjecting the pigment and carrier to intense mechanical forces in a liquid medium. Apparatus of this type is known in a relatively large number of embodiments. They are based, for example, on the principle of a large velocity gradient produced in a liquid medium or on a sudden change of direction, or, in particular, on the impacting action or mutual friction of particles of the grinding medium, such as metal, glass or porcelain spheres, plastic granules or grains of sand, which are set in motion by the rotation of the vessel or, even more effectively, by vibrators or stirrer-like devices, for example in glass bead mills.

Within technologically sensible limits the grinding temperature is not critical. Grinding will advantageously be carried out at temperatures between 5° and 90° C., preferably at 15° to 70° C.

Even though the pigment suspension to be ground will generally be neutral, it may in certain cases be advantageous to shift the pH of the pigment suspension into the acid or alkaline range.

It is possible to add to the grinding not only the 1,2-dihydroxy compounds which have to be used, according to the invention, but also additives which have a favourable effect on the application properties of the ground pigments, for example texture-protecting agents. Such additives can be added in amounts of 0.05 to 25, preferably 1 to 15, % by weight, based on the pigment or pigment mixture to be ground.

Examples of suitable texture-protecting agents are fatty acids having at least 12° C. atoms, such as stearic acid or behenic acid, their amides, salts or esters, such as magnesium stearate, zinc stearate, aluminium stearate or magnesium behenate, and also quaternary ammonium compounds, such as tri-($C_1$–$C_4$)-alkylbenzylammonium salts, and also plasticisers, such as epoxidised soya bean oil, waxes, such as polyethylene wax, resin acids, such as abietic acid, colophony soap, hydrogenated or dimerised colophony, $C_{12}$–$C_{18}$-paraffindisulfonic acids, alkylphenols or alcohols, such as stearyl alcohol.

Preferred texture-protecting agents are laurylamine, stearylamine, stearic acid, its amides, salts or esters, epoxidised soya bean oil, waxes and resin acids.

The process of the invention is generally carried out in the absence of organic solvents, although small amounts thereof can be tolerated as long as they do not interfere with the process.

In the process of the invention, the grinding apparatus is charged with pigment, 1,2-dihydroxy compound, water and any additives at one and the same time or in succession. Grinding continues until the pigment or pigment mixture is in the desired, hiding or more transparent form. Depending on the grinding apparatus, pigment and additives, that generally takes ½ to 72 hours. The length of grinding necessary for a particular case is easily determined.

The pigment suspension can be worked up in a known manner by filtering off the pigments, removing those additives not remaining in the pigment and drying. Water-insoluble 1,2-dihydroxy compounds can be removed by washing the filter cake with an organic solvent, such as methanol, and water-soluble 1,2-dihydroxy compounds, such as hexane-1,2-diol, can be removed by washing the filter cake with water. Although it is not necessary, it can be of advantage, depending on the pigment and its intended use, to use water-insoluble 1,2-dihydroxy compounds and leave them in the pigment or pigment mixture.

For it is a fact that the 1,2-dihydroxy compounds in turn act as texture-protecting agents and are able to prevent the pigment particles from reagglomerating in the course of their further processing. The presence in the ground pigment or pigment mixture of a 1,2-dihydroxy compound has at any rate a favourable effect on the dispersibility of the pigment or pigment mixture. The pigments can be dried with good results in conventional apparatus, such as vacuum or circulating air oven, paddle dryers, fluidised bed or freeze dryers or spray-dryers.

In certain cases it is possible to use the process of the invention to comminute the pigment crystals in such a way that the particles formed have a certain crystal habit. For instance, it is possible to start from very coarse pigment crystals which, what is more, have high refractive indices, and directly obtain pigments which, by virtue of the particle size and particle size distribution produce and by virtue of a high proportion of isometric particles, attain great hiding power. The after-treatment for producing such particles which is generally necessary in other processes is dispensed with.

The process of the invention also makes it possible to obtain very fine pigment crystals, since the presence of a 1,2-dihydroxy compound prevents the fine pigment particles from reagglomerating, as they are frequently observed to do especially under intense grinding conditions. Even if the 1,2-dihydroxy compound is not removed in the course of working-up, the fine pigment crystals thus obtained produce very strong transparent colourings.

If, after the grinding, the 1,2-dihydroxy compound remains in the pigment or pigment mixture, it is observed to be highly compatible in any amount with the substrate it colours. Nor does it impair the properties of the pigmented substrate, for example the fastness to heat, weathering, light and migration.

The pigments obtained by the process of the invention are suitable for pigmenting high molecular weight organic material, for example cellulose ethers and esters, such as ethylcellulose, acetylcellulose, nitrocellulose, polyamides or polyurethanes or polyesters, natural resins or synthetic resins, in particular urea- and melamine-formaldehyde resins, alkyd resins, phenoplasts, polycarbonates, polyolefins, such as polyethylene, polypropylene or polystyrene, polyvinyl chloride, polyacrylonitrile, polyacrylates, thermoplastic or thermosetting acrylic resins, rubber, casein, silicone and silicone resins, singly or mixed. Said high molecular weight compounds can be in the form of plastic compositions, melts, spinning solutions, paints or printing inks. Depending on the intended use, it is advantageous to use the pigments as toners or in the form of preparations.

The high molecular weight organic material coloured with pigments conditioned by the process of the invention are distinguished by very bright and level shades, high colour strength, high gloss, high light and weathering fastness and high thermal resistance.

In the following examples the parts and percentages are by weight, unless otherwise stated.

EXAMPLE 1

8.1 parts of coarse perylenetetracarboxylic dianhydride needles and 0.9 part of dodecane-1,2-diol are ground for 3½ hours at 2,000 r.p.m. by means of a nylon disc stirrer in 40 parts of water and 90 parts by volume of sand (Ottawa sand having a diameter of 2–3 mm) in a 500 parts by volume capacity beaker without external cooling. The ground pigment suspension is separated from the sand, which is washed with water, and the pigment is then filtered off. The press cake is dried at 70°–80° C. in a vacuum drying oven and is pulverised when dry. This gives 8 parts of conditioned perylenetetracarboxylic dianhydride pigment which contains about 10% of dodecane-1,2-diol and which, incorporated in rolled plasticised-PVC film, produces very strong, hiding, red colourings having excellent fastness properties. The conditioned pigment contains a large number of particles of isometric shape, which fact is largely responsible for the great hiding power.

EXAMPLE 2

8.1 parts of coarse γ-modification needles of bis-(3,5-dimethylphenyl)-perylenetetracarboximide obtained as in Example 1 of European Patent A 23,191 and 0.9 part of octane-1,2-diol are ground for 5 hours at 2,000 r.p.m. by means of a nylon disc stirrer in 40 parts of water and 90 parts by volume of sand (Ottawa sand having a diameter of 2–3 mm) in a 500 parts by volume capacity beaker without external cooling. The ground pigment suspension is separated from the sand, which is washed with water, and the pigment is then filtered off. The press cake is dried at 70°–80° C. in a vacuum drying oven and is pulverised when dry. This gives 8.0 parts of conditioned bis-(3,5-dimethylphenyl) perylenetetracarboximide pigment which, incorporated in paints and plastics, produces strong, hiding bluish red colourings having excellent fastness properties. The pigment conditioned in this way has a large number of particles of isometric shape, which fact is largely responsible for the great hiding power.

EXAMPLE 3

13.0 parts of the brown disazo condensation pigment C. I. Pigment Brown 23, 1.7 parts of dodecane-1,2-diol, 0.3 part of stearylamine and 0.3 part of stearic acid in 130 parts of water are heated with stirring to 70° C. in a 300 parts by volume capacity beaker. After stirring for about 15 minutes the suspension is cooled down to 20°–25° C. and is poured into a 500 parts by volume capacity glass bead mill. The pigment suspension is diluted with water to 140 parts, 400 parts of glass spheres having a diameter of 3.5–4.0 mm are added, the suspension is ground at 30°–35° C. for 5½ hours, and, when the grinding process has ended, the pH is adjusted to 7.0. The pigment suspension is separated from the glass spheres, which are slightly washed with water, and the pigment is then filtered off. The press cake is washed with water and dried at 70°–80° C. in a vacuum drying oven. This gives 13.0 parts of a brown pigment which, on incorporation into rolled plasticised-PVC film, produces transparent and very strong brown colourings having excellent fastness properties. The pigment conditioned in this way is very easily dispersed in the plastic material, in spite of the fine particle state.

EXAMPLE 4

Example 2 is repeated, except that an orange isoindoline pigment obtained as in Example 51 of German Patent 2,814,526 is used in place of bis-(3,5-dimethylphenyl) perylenetetracarboximide and grinding takes place for 20 hours instead of 5 hours, affording a pigment which, incorporated into paints and plastics, produces very hiding and strong orange colourings having excellent fastness properties. The pigment conditioned in this way has a large number of particles of isometric shape.

EXAMPLE 5

13.0 parts of coarse crystals of the disazo condensation pigment C. I. Pigment Red 220, 1.8 parts of dodecane-1,2-diol and 0.2 part of hexadecane-1,2-diol in 130 parts of water are heated with stirring to 70° C. in a 300 parts by volume capacity beaker. After stirring for about 15 minutes, the suspension is cooled down to 20°-30° C. and is poured into a 500 parts by volume capacity glass bead mill. The pigment suspension is diluted with water to 140 parts, 400 parts of glass beads having a diameter of 3.5–4.0 mm are added, and the suspension is ground at 30° to 35° C. for 2¾ hours. The pigment suspension is separated from the glass spheres, which are washed with water, and the pigment is then filtered off. The press cake is dried at 70°-80° C. in a vacuum drying oven to give 13.3 parts of a red pigment which after pulverisation and satisfactory dispersal in plastics and paints, produces transparent and strong red colourings.

EXAMPLE 6

13.5 parts of coarse crystals of the disazo condensation pigment C. I. Pigment Red 166, 1.5 parts of dodecane-1,2-diol and 130 parts of water are stirred in a 500 parts by volume capacity glass bead mill to give a suspension. 400 parts of glass beads having a diameter of 3.5 to 4.0 mm are added to the pigment suspension, which is then ground for 12 hours at 30° to 35° C. and 320 r.p.m. The pigment suspension is separated from the glass spheres, which are washed with water, and the pigment is then filtered off. The press cake is washed with water and dried at 70° to 80° C. in a vacuum drying oven. This gives 14.1 parts of a pigment which contains about 10% of dodecane-1,2-diol and which, after pulverisation, can be satisfactorily dispersed in plastic and paints, and produces very strong, red colourings which are much more transparent than the starting pigment form.

EXAMPLE 7

13.5 parts of coarse crystals of the nickel-azomethine complex obtained as in Example 27 of European Patent A 36,835, 1.5 parts of octane-1,2-diol and 125 parts of water are stirred in a 500 parts by volume capacity glass bead mill to give a suspension. 400 parts of glass spheres having a diameter of 3.5–4.0 mm are added to the suspension, which is then ground for 9 hours at 30°-35° C. and 320 r.p.m. The suspension is separated from the glass spheres, which are washed with water, and the pigment is then filtered off. The octane-1,2-diol is washed out of the press cake by means of methanol, and the press cake is dried at 70°-80° C. in a vacuum drying oven. This gives 13 parts of a yellowish red pigment which is more transparent and stronger than the starting material. Incorporation into stoving enamels produces yellowish red colourings having excellent light and weathering fastness properties.

EXAMPLE 8

Example 7 is repeated, except that hexane-1,2-diol is used in place of octane-1,2-diol and the press cake is washed with water instead of methanol, affording 12.8 parts of a yellowish red pigment having similar good properties.

EXAMPLE 9

Example 7 is repeated, except that coarse crystals of the anthraquinonoid pigment C. I. Pigment Yellow 147 are used in place of the pigment described there, and a mixture of 1.2 parts of dodecane-1,2-diol and 0.3 part of octane-1,2-diol is used in place of the 1.5 parts of octane-1,2-diol, affording a yellow pigment toner which can be satisfactorily dispersed in paints and plastics and produces yellow colourings which, compared with the starting form, are much brighter, more transparent and stronger and have very good fastness properties.

EXAMPLE 10

180 parts of the isoindolinone pigment C. I. Pigment Yellow 110 in the unfinished state and 20 parts of dodecane-1,2-diol are stirred together with 1,500 parts of water in a beaker to give a suspension, which is then heated with stirring to 70° C. and is cooled down to 30°-35° C. 15 minutes later. The pigment suspension is diluted with water to a weight of 1,800 parts. The pigment suspension is thoroughly ground at 30°-35° C. for 3 hours at a stirrer speed of 3,000 r.p.m. and a pump speed of 30 r.p.m. in a KDL Dyno mill from the company Willy A. Bachofen, Basel, which has a 600 parts by volume capacity steel grinding container filled with 480–510 parts by volume of glass spheres having a diameter of 1 mm. The pigment suspension is separated from the glass spheres, which are washed with 500 parts of water. The pigment is filtered off, the press cake is washed with 1,000 parts of water and dried at 70°-80° C. in a vacuum drying oven and the pigment is pulverised in an Osterizer mixer. This gives 190 parts of a yellow pigment toner which contains about 10% of dodecane-1,2-diol and which, on incorporation into paints and plastics, produces very transparent yellow colourings which are stronger than the starting form. Although the ground pigment is very finely grained, it is easily dispersed in the application media.

EXAMPLE 11 a) 80 parts of dodecane-1,2-diol are heated to 80° C., and melted, in a beaker. 20 parts of the polyethylene/polyvinyl acetate copolymer AC copolymer 400 ® (from the company Allied Chemicals) are added with stirring at 80° to 100° C., and the resulting mixture is stirred at about 100° C. for 20 minutes to give a clear melt, which is then cooled down to 0° C., where it solidifies. The solidified mixture of dodecane-1,2-diol and AC copolymer 400 ® obtained in this way is pulverised in an Osterizer mixer and is forced through a metal sieve having a mesh size of 1 mm. The mixture is then in the form of a white powder.

b) Example 10 is repeated, except that 20 parts of the white powder prepared in Example 11a, which consists of 80% dodecane-1,2-diol and 20% AC copolymer 400 ®, are used in place of the 20 parts of dodecane-1,2-diol, and grinding takes place for only 2¼ hours instead of 3 hours, affording a yellow pigment having equally good properties.

EXAMPLE 12

Example 6 is repeated, except that coarse crystals of N,N'-dimethyl-perylenetetracarboximide pigment as directly obtained in synthesis are used in place of C. I. Pigment Red 166 and grinding takes place for 9 hours instead of 12 hours, affording a bordeaux-coloured pigment which, on incorporation into plastics and paints, produces strongly hiding colourings having excellent fastness properties.

EXAMPLE 13

Example 6 is repeated, except that coarse crystals of the perinone pigment C. I. Pigment Orange 43 as directly obtained in synthesis are used in place of C. I. Pigment Red 166 and grinding takes place for 7 hours instead of 12 hours, affording a pigment which, on incorporation into plastics and paints, produces colourings which are significantly stronger and brighter than those of the starting material.

EXAMPLE 14

Example 6 is repeated, except that the dioxazine pigment C. I. Pigment Violet 37 as directly obtained in synthesis is used in place of C. I. Pigment Red 166 and grinding takes place for 9 hours instead of 12 hours, affording a violet pigment which is much stronger and brighter than the starting material and which can be incorporated into plastics, paints and printing inks with good results.

EXAMPLE 15

Example 6 is repeated, except that the quinacridone pigment C. I. Pigment Red 122 as directly obtained in synthesis is used in place of C. I. Pigment Red 166 and grinding takes place for 10 hours instead of 12 hours, affording a bluish red pigment which is stronger than the starting material and has very good dispersing and excellent fastness properties.

EXAMPLE 16

Example 6 is repeated, except that a tetrachlorothioindigo pigment as directly obtained in synthesis is used in place of C. I. Pigment Red 166 and grinding takes place for only 6 hours instead of 12 hours, affording a violet pigment which is stronger and brighter than the starting material and which can be incorporated into plastics, paints and printing inks with good results.

EXAMPLE 17

Example 6 is repeated, except that unfinished β-Cu-phthalocyanine pigment is used in place of C. I. Pigment Red 166 and grinding takes place for 6 hours instead of 12 hours, affording a blue pigment which is stronger than the starting form and which can be satisfactorily dispersed in plastics.

EXAMPLE 18

Example 6 is repeated, except that a pigment mixture consisting to 50% of the isoindolinone pigment C. I. Pigment Yellow 110 and 50% of the disazo condensation pigment C. I. Pigment Brown 23 is used in place of C. I. Pigment 166 and grinding takes place for only 3 hours instead of 12 hours, affording, on incorporation into plastics or paints, yellowish brown colourings having excellent heat, light and weathering fastness properties.

EXAMPLE 19

Example 9 is repeated, except that 1.5 parts of hexadecane-1,2-diol are used in place of the mixture of 1.2 parts of dodecane-1,2-diol and 0.3 part of octane-1,2-diol, affording a yellow pigment toner having similar good properties.

EXAMPLE 20

A mixture of 130 parts of steatite spheres with a diameter of 8 mm, 47.5 parts of an alkyd-melamine stoving enamel consisting of 60 parts of Beckosol 27-320 ® (60% in xylene, Reichhold Chemie AG), 36 parts of Super-Beckamin 13-501 ® (50%, Reichhold Chemie AG), 2 parts of xylene and 2 parts of ethylene glycol monomethyl ether, and 2.5 parts of the metal complex pigment obtained in Example 7 are converted into a dispersion in a 200 ml glass bottle with a twist-off cap in the course of 120 hours on a tumbling frame. The steatite spheres are separated off, and 2.4 parts of the full-shade mixture thus dispersed, 6.0 parts of Kronos RN 59 ® (Kronos Titan GmbH) titanium dioxide and 24.0 parts of the above alkyd melamine stoving enamel are mixed, and the mixture is sprayed onto aluminium panels and then baked at 130° for 30 minutes. This gives yellowish red colourings having excellent fastness properties.

EXAMPLE 21

A mixture of 1.0 part of the pigment obtained in Example 6, 1.0 part of the antioxidant IRGANOX 1010 ® (CIBA-GEIGY AG) and 1,000.0 parts of Vestolen A 60-16 ® (hüls) high density polyethylene granules is premixed in a glass bottle on a tumbling frame in the course of 15 minutes. The mixture is then extruded on a single-screw extruder in two passes, and the resulting granules are injection-moulded at 220° C. on an injection-moulding machine (Allround Aarburg 200) to give plates/which are then compression-moulded at 180° for 5 minutes. The compression-moulded plates have strong red shades with excellent fastness properties.

EXAMPLE 22

A mixture for colouring polyvinyl chloride is prepared from 65 parts of stabilised polyvinyl chloride, 35 parts of dioctyl phthalate and 0.2 part of the perylene pigment prepared in Example 1 and is worked to and fro between two rolls of a calender for 5 minutes at about 150° C. The plasticised-PVC film thus obtained was a red colouring which is very hiding and very strong and has excellent light fastness properties.

What is claimed is:

1. An improved process for conditioning organic pigments by grinding an organic pigment or mixture of organic pigments selected from the group consisting of the quinacridone series and of perylenetetracarboxylic acid dianhydride in water with a grinding aid wherein the improvement comprises using as a grinding aid an unsubstituted aliphatic 1,2-dihydroxy compound having 6 to 18 carbon atoms in amounts of 0.5 to 20% by weight, based on the pigment or pigment mixture to be ground.

2. A process according to claim 1 wherein the grinding aid is hexane-1,2-diol, octane-1,2-diol, dodecane-1,2-diol or hexadecane-1,2-diol.

3. A process according to claim 1 wherein a texture-protecting agent is used in addition to the 1,2-dihydroxy compound.

4. A process according to claim 3 wherein the texture-protecting agent is selected from the group consisting of laurylamine, stearylamine, stearic acid, stearic acid amides, stearic acid salts, stearic acid esters, epoxidized soya bean oil, waxes and resin acids.

5. A process according to claim 1 wherein the grinding is carried out at 15° to 70° C.

6. A process according to claim 1 wherein the organic pigment is one which tends to agglomerate when subjected to mechanical forces.

7. A method of pigmenting high molecular weight organic material by incorporating therein an effective amount of a pigment conditioned according to the process of claim 1.

8. A high molecular weight organic material pigmented by an effective amount of a pigment conditioned according to the process of claim 1.

* * * * *